United States Patent Office 3,202,512
Patented Aug. 24, 1965

3,202,512
PHOTOGRAPHIC SILVER HALIDE EMULSIONS STABILIZED WITH TETRAZAINDENE COMPOUNDS
Leslie Alfred Williams, Wealdstone, Middlesex, England, assignor to Eastman Kodak Company, Rochester, N.Y., a corporation of New Jersey
No Drawing. Filed Feb. 23, 1962, Ser. No. 175,283
12 Claims. (Cl. 96—109)

This is a continuation-in-part application of my application Serial No. 86,007, filed January 31, 1961, now abandoned.

This invention relates to the synthesis of certain tetrazaindene compounds, as well as photographic products stabilized therewith.

It is well known that certain tetrazaindene compounds can be synthesized by condensing an alkoxymethylenemalonic acid ester with a 3-amino-1,2,4-triazole. However, such condensations have traditionally been carried out under neutral or acidic conditions, and it has been found that it is not possible to produce 6-oxo-1,3,3a,7-tetrazaindene compounds by this process.

It is, therefore, an object of my invention to provide a method of preparing 6-oxo-1,3,3a,7-tetrazaindene compounds. A further object is to provide novel 6-oxo-1,3,3a,7-tetrazaindene compounds. Still another object is to provide photographic emulsions which have been stabilized by treatment with small amounts of such tetrazaindene compounds. Other objects will become apparent from a consideration of the following description and examples.

I have found that the above objects can be accomplished by condensing an alkoxymethylenemalonic acid ester with a 3-amino-1,2,4-triazole compound under alkaline conditions. Many of the tetrazaindene compounds which can be obtained according to my invention can be represented by the following general formula:

(I)
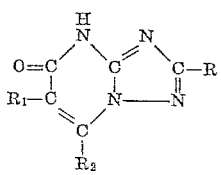

wherein R represents a hydrogen atom, an alkyl group, such as methyl, ethyl, propyl, isopropyl, butyl, isobutyl, etc. (e.g., an alkyl group containing from 1 to 4 carbon atoms), an aryl group of the benzene series, such as phenyl, o-, m- or p-tolyl, etc. (e.g., a monocyclic aryl group of the benzene series, an amino group, such as amino, methylamino, piperidyl, morpholinyl, etc., an alkylmercapto group, such as methylmercapto, ethylmercapto, etc., or a mercapto group, $R_1$ represents a hydrogen atom, a carboxyl group (including water-soluble salts thereof, such as sodium, potassium, pyridinium, triethanolammonium, etc.), or a carbolkoxyl group, such as carbomethoxyl, carboethoxyl, carbobutoxyl, etc., and $R_2$ represents a hydrogen atom or a lower alkyl group, such as methyl, ethyl, etc.

According to my invention, the tetrazaindene compounds of Formula I, wherein $R_1$ represents a carbalkoxyl group, can be prepared by condensing one molecule of an alkoxymethylenemalonic acid ester of the following general formula:

(II) 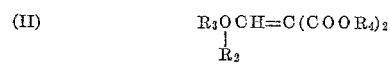

wherein $R_2$ has the values given above, $R_3$ and $R_4$ each represent a lower alkyl group, such as methyl, ethyl, propyl, butyl, etc., with one molecule of a 3-amino-1,2,4-triazole compound of the following general formula:

(III)
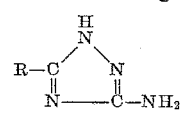

wherein R has the values give above. As indicated above, the condensation of the compounds of Formula II with those of Formula III is carried out under alkaline conditions. By alkaline conditions, I mean under conditions of a pH of at least about 8.0. Of course, more basic conditions than a pH of 8.0 can be employed, and it is to be understood that my invention is not limited to that particular pH condtion. Suitable basic condensing agents include alkali metal alkoxides, such as sodium methoxide, sodium ethoxide, sodium propoxide, sodium butoxide, potassium ethoxide, etc. Alkali metal hydroxides can also be employed as basic condensing agents, typical examples of which include sodium hydroxide, potassium hydroxide, etc. The condensation can be carried out in the presence of an inert diluent, such as a lower alcohol (e.g., methanol, ethanol, propanol, etc.), 1,4-dioxane, diethyl ether, etc.

The condensations can be accelerated by heating, although temperatures varying from ambient temperatures (ca. 25°C.) to the reflux temperature of the reaction mixture can be employed.

The tetrazaindene compounds of Formula I above, wherein $R_1$ represents a carboxyl group, can be obtained by de-esterifying the compounds of Formula I, wherein $R_1$ represents a carbalkoxyl group. De-esterification can be effected by simply heating the esterified derivatives in the presence of a strongly alkaline aqueous solution, such as an aqueous solution of sodium hydroxide, potassium hydroxide, etc. The free acid compounds ($R_1$ is carboxyl) can be obtained by simply acidifying the de-esterification mixture.

The compounds of Formula I, wherein $R_1$ represents a hydrogen atom, can be obtained by decarboxylation of the compounds of Formula I, wherein $R_1$ represents a carboxyl group. Decarboxylation can be effected by simply heating the carboxyl derivatives on an oil bath at a temperature of at least about 250° C.

As indicated above, the condensation of the compounds of Formula II with those of Formula III can be effected under basic conditions to provide the 6-oxo compounds of my invention. A very strongly basic agent, such as sodium ethoxide, will give entirely, or almost entirely, the 6-oxo compound of Formula I accompanied by little, or none, of the corresponding isomeric 4-oxo compounds of the prior art. When R of Formula III is not strongly electron donating, e.g., hydrogen, lower alkyl or mercapto, it is frequently possible to use a rather weak basic condensing agent, such as pyridine, a luitidine, a collidine, etc., in which case there is obtained a large yield of the 6-oxo compound of my invention, or a mixture containing the 6-oxo compound, together with some isomeric 4-oxo compound, from which the 6-oxo compound can be easily separated. When R of Formula III is strongly electron donating, such as amino, a very strong basic condensing agent, such as sodium ethoxide, should be employed.

The following examples will serve to illustrate more fully the manner of preparing 6-oxo-1,3,3a,7-tetrazindene compounds according to my invention.

*Example 1.—5-ethoxycarbonyl-4-methyl-6-oxo-1,3,3a,7-tetrazaindene*

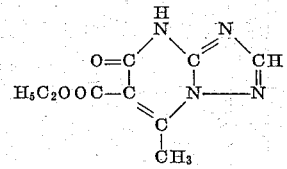

Sodium (4.6 g.) was dissolved in alcohol (120 cc.) and to this solution 3-amino-1,2,4-triazole (16.8 g.) and diethyl-α-ethoxyethylidenemalonate (46.0 g) were added. The mixture was refluxed for 6 hours after which water (120 cc.) was added, the solution was chilled and acidified with concentrated hydrochloric acid. The product was collected and recrystallized from water as colorless crystals, M.P. 208° C. Yield 26 g. (Found C, 48.5; H, 4.9; N, 25.4; $C_9H_{10}N_4O_3$ requires C, 48.6; H, 4.5; N, 25.3%.)

*Example 2.—5-carboxy-4-methyl-6-oxo-1,3,3a,7-tetrazaindene*

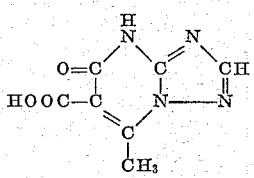

The above ester (26 g.) was refluxed in 10% aqueous caustic soda solution (150 cc.) for 1 hour. After cooling, the solution was acidified with concentrated hydrochloric acid and chilled. The product (21 g.) was recrystallized from water as colorless crystals, M.P. 228–229° C. with gas evolution. (Found C, 43.6; H, 3.4; N, 29.7;

$C_7H_6N_4O_3$ requires C, 43.3; H, 3.1; N, 28.9%.)

*Example 3.—4-methyl-6-oxo-1,3,3a,7-tetrazaindene*

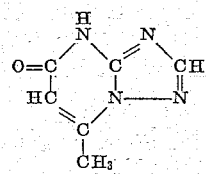

The acid obtained in Example 2 (5 g.) was heated under vacuum in an oil-bath at 280° C. The solid melted with evolution of gas and the product sublimed into a short air condenser. It (3 g.) was recrystallized from water as colorless plates, M.P. 266–267° C. (Found C, 47.8; H, 4.1; N, 37.5; requires C, 48.0; H, 4.0; N, 37.3%.)

*Example 4.—5 - ethoxycarbonyl-4-methyl-2-methylthio-6-oxo-1,3,3a,7-tetrazaindene*

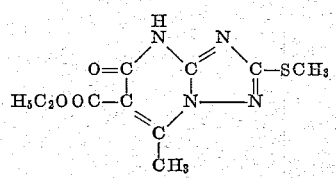

Sodium (2.3 g.) was dissolved in alcohol (60 cc.) and to this solution diethyl α-ethoxyethylidenemalonate (23.0 g.) and 3-amino-5-methylthio-1,2,4-triazole (13.0 g., Ber. 54B 2089 (1921)) were added. The mixture was refluxed for 1.5 hours by which time the whole had set to a solid. Water (60 cc.) was added and the solution chilled and acidified with concentrated hydrochloric acid to give colorless crystals which were recrystallized from 50% acetic acid as glistening needles, M.P. 214° C. Yield 12 g. (Found C, 44.3; H, 4.6; N, 20.3; S, 11.9; $C_{10}H_{12}N_4O_3S$ requires C, 44.7; H, 4.8; N, 20.8; S, 11.9%.)

*Example 5.—5 - carboxy - 4-methyl-2-methylthio-6-oxo-1,3,3a,7-tetrazaindene*

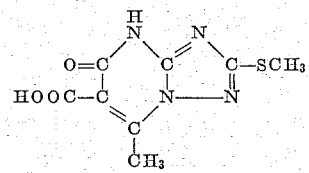

5 - ethoxycarbonyl - 4-methyl - 2-methylthio-6-oxo-1,3,3a,7-tetrazaindene (2.2 g.) was refluxed in 10% aqueous caustic soda solution (20 cc.) for 1 hour, after which the solution was cooled and acidified with concentrated hydrochloric acid. The precipitate (1.5 g.) was collected and washed with water and recrystallized from water as colorless crystals, M.P. 236° C.

*Example 6.—4 - methyl - 2-methylthio-6-oxo-1,3,3a,7-tetrazaindene*

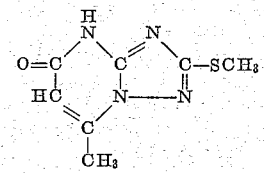

5 - carboxy - 4 -methyl-2-methylthio-6-oxo-1,3,3a,7-tetrazaindene was heated under vacuum to its melting point until the evolution of carbon dioxide ceased. The product was recrystallized from water as colorless needles, M.P. 280–281° C. (Found C, 42.2; H, 4.3; N, 28.9; S, 16.3; $C_7H_8N_4OS$; requires C, 42.6; H, 4.6; N, 28.4; S, 16.3%.)

*Example 7.—2 - amino - 5 - ethoxycarbonyl-4-methyl-6-oxo-1,3,3a,7-tetrazaindene*

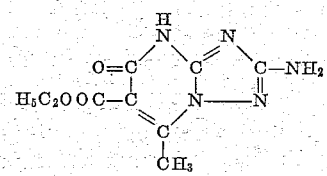

2,5 - diamino - 1,2,4-triazole (9.9 g.) and diethyl α-ethoxyethylidenemalonate (23.0 g.) were refluxed together in ethanol (60 cc.) in which sodium (2.3 g.) had previously been dissolved. After 3–3.5 hours, water (60 cc.) was added and the solution acidified. The solid (5 g.) was collected and recrystallized from water as needles, M.P. >300° C. (Found C, 45.2; H, 4.7; N, 29.9; $C_9H_{11}N_5O_3$ requires C, 45.5; H, 4.6; N, 29.6%.)

*Example 8.—2 - amino - 5 - carboxy-4-methyl-6-oxo-1,3,3a,7-tetrazaindene*

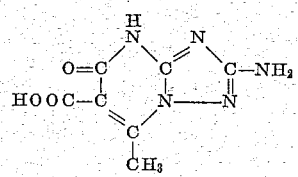

The ester made as in Example 7 (4 g.) was refluxed in 10% aqueous caustic soda solution (40 cc.) for 1 hour. After cooling, the product was precipitated by the addition of concentrated hydrochloric acid. It (2.5 g.) was purified by dissolving in caustic soda, treating the solution with charcoal and re-precipitating with hydrochloric acid. The product was suspended in boiling water to remove all inorganic impurities, M.P. 360° C. (Found C, 40.0; H, 3.5; N, 33.5; $C_7H_7N_5O_3$; requires C, 40.2; H, 3.4; N, 33.5%.)

*Example 9.*—*2 - amino - 4 - methyl-6-oxo-1,3,3a,7-tetrazaindene*

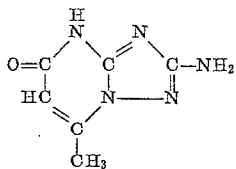

The above acid (Example 8, 1.5 g.) was heated under vacuum until all had sublimed into a short air condenser. (The starting material did not melt.) The product was collected and recrystallized from water as colorless needles, M.P. 357° C. Yield 1 g. (Found C, 43.3; H, 4.4; N, 42.9; $C_6H_7N_5O$ requires C, 43.6; H, 4.2; N, 42.4%.)

*Example 10.*—*5 - ethoxycarbonyl-2-methylthio - 6-oxo-1,3,3a,7-tetrazaindene*

Sodium (2.3 grams) was dissolved in alcohol (60 ccs.) and to this solution 3-amino-5-methylthio-1,2,4-trizole (13 grams) and diethyl-ethoxymethylidene malonate (21.6 grams) were added. The mixture was refluxed for about 16 hours after which water (400 ccs.) was added and boiled to bring into solution. The solution was acidified while still boiling. It was cooled to room temperature and the crystals which formed and contained the 4-oxo isomer of the required compound, were discarded. The filtrate was chilled to 4° C. whereupon colorless needles of the required 6-oxo compound separated and were filtered. These crystals were recrystallized from water to a yield of 2 grams (M.P. 209–210° C.). (Found C, 42.7; H, 4.2; N, 21.8; S, 12.9; $C_9H_{10}N_4O_3S$ requires C, 42.7; H, 4.0; N, 22.0; S, 12.6%.)

The following example will serve to illustrate a different preparation for the compound of Example 1 above, using a weak basic condensing agent, such as pyridine.

*Example 11.*—*5 - ethoxycarbonyl - 4 - methyl - 6 - oxo-1,3,3a,7-tetrazaindene*

3-amino-1,2,4-triazole (4.2 grams) and ethyl 2-ethoxy-1-ethoxycarbonylcrotonate (11.5 grams) were refluxed together in pyridine (30 cc.) for 16 hours. During this reaction, both the required 6-oxo compound and the isomeric 4-oxo compound are formed. After cooling this mixture, ether (90 cc.) was added, and the mixture was shaken for about 2 minutes. The precipitate, which contains the 4-oxo compound as a pyridinium salt, was collected and discarded. The desired product was obtained as crystals on further chilling the filtrate. (Found C, 48.5; H, 4.9; N, 25.4; $C_9H_{10}N_4O_3$ requires C, 48.6; H, 4.5; N, 25.3%.)

I have also found an improved method for making the intermediate starting compounds of Formula II which gives surprisingly higher yields than the known methods of making these compounds, especially in those cases where $R_2$ represents a lower alkyl group. According to this improved method, an alkyl orthoacetate is condensed with an alkyl malonate, preferably with heating, in the presence of a basic condensing agent, such as an alkali metal alkoxide (e.g., sodium ethoxide, potassium ethoxide, sodium propoxide, etc.), an alkali metal hydroxide (e.g., sodium hydroxide, potassium hydroxide, etc.). The following example will serve to illustrate the preparation of such an intermediate.

*Example 12.*—*Diethyl- -ethoxyethylidenemalonate*

Ethyl orthoacetate (324 grams), ethyl malonate (320 grams) and powedered anhydrous potassium hydroxide (5.6 grams) were heated together in an oil-bath. The temperature was raised during ½ to ¾ hour to 170° C. by which time the distillation of alcohol commenced, and was collected after fractionation through a short column. Heating was continued and the temperature raised as necessary to maintain the distillation of the alcohol. After about 4 hours (bath temperature 205° C.) the distillation of alcohol ceased (200 ccs. were collected). The reaction mixture was allowed to cool to 80° C., a vacuum was applied and heating was recommenced. A small fore-run (below B.P. at 96/2 mm. pressure) was obtained and discarded, while the crude product was collected between 96-130° C. at 2 mm. pressure. This fraction was re-distilled and the fraction boiling (between 96–98° C., 2 mm.) was collected and was purified further by the method described by McElvain and Burkett in the J.A.C.S. vol. 64, page 1831 to give 180 grams of the required compound as crystals, M.P. 25–27° C. (Found C, 57.5; H, 8.1; $C_{11}H_{18}O_5$ requires C, 57.4; H ,7.8%.)

The 6-oxo compounds of my invention can be added to ordinary photographic silver halide emulsions in order to stabilize such emulsions and prevent the formation of fog upon storage of these emulsions, particularly under adverse conditions, such as high temperatures and humidity.

Fog depends both on the emulsion and the conditions of development; for a given emusion it increases with the degree of development. With constant development conditions, it tends to increase with time, temperature and relative humidity of storage conditions; it is common practice to make accelerated tests of the stability of photographic emulsions by storage at increased temperature or humidity, or both. It is, of course, desirable to have emulsions as stable as possible under the conditions of high temperature and humidity which may occur in tropical climates, for example. Fog usually appears over the whole area of the sensitive coating, but when severe, it frequently is non-uniform. Fog may also be caused by exposure to chemicals, for example, hydrogen sulfide and other reactive sulfur compounds, hydrogen peroxide vapor,, and strongly reducing materials. While antifoggants and stabilizers may protect, to some extent, against such effects, it is normally understood that an antifoggant protects against spontaneous growth of fog during prolonged storage or storage at high temperatures and humidities, or during development to maximum contrast and speed, or both.

The 6-oxo compounds of my invention can be used in a variety of photographic silver halide emulsions, including those used in the manufacture of fast negative materials and X-ray elements. The stabilizing compounds of my invention cause an elevation in the emulsion speed when using high intensity exposures, while the low intensity speed is not impaired to the degree associated with other related and isomeric stabilizers. It has also been found that many of the 6-oxo compounds of my invention have little or no detectable effect upon the spectral sensitivity of photographic silver halide emulsions containing them, while this is not true for many other tetrazaindene stabilizing compounds.

The following data will serve to illustrate the useful stabilizing or antifoggant effect of many of the compounds represented by Formula I of my invention. These data were obtained using an ordinary high-speed silver bromoidide emulsion (negative type) which had been panchromatically sensitized with a cyanine dye. The sensitized emulsion was divided into several batches, and each batch was separately treated with a quantity of stabilizing compound in the amount shown in the tables. One batch of each emulsion was not treated and this particular batch served as a control. The separate batches of emulsion were then coated on an ordinary support, such as cellulose acetate and dried. Samples of the dried coatings were then immediately exposed on an Eastman Ib Sensitometer with tungsten illumination and developed for 5 minutes in Kodak Developer DK–50 at 68° F. with good agitation. The developed coatings were then fixed, washed and dried in the usual manner.

The relative speeds, gammas and fogs of each of the coatings were then measured in the usual manner.

Separate samples of the above coatings were incubated for 2 weeks at 120° F. with constant humidity and the incubated strips were then exposed and processed exactly as the fresh coatings. The relative speeds, gammas and fogs for the various coatings were then measured as before. The relative speeds in each instance are inversely proportional to the exposure required to produce a developed density of 0.3 above fog. The DK–50 Developer has the following formula:

| | Grams |
|---|---|
| N-methyl-p-aminophenol sulfate | 2.5 |
| Hydroquinone | 2.5 |
| Sodium sulfite (desiccated) | 30.0 |
| Sodium metaborate | 10.0 |
| Potassium bromide | 0.5 |
| Water to make 1 liter. | |

The following data were obtained:

TABLE A

| Coating Number | Description (g./Ag mole) | Fresh Tests | | | 2 Weeks Inc., 120° F. | | |
|---|---|---|---|---|---|---|---|
| | | Rel. Speed | γ | Fog | Rel. Speed | γ | Fog |
| (a) | Control | 100 | 1.13 | .11 | 37 | 0.67 | .61 |
| (b) | 5-carboxy-4-methyl-6-oxo-1,3,3a,7-tetrazaindene, 1.6 g. | 68 | 1.42 | .08 | 65 | 1.15 | .14 |
| (c) | Control | 100 | 1.07 | .10 | 71 | 0.75 | .34 |
| (d) | 4-methyl-6-oxo-1,3,3a,7-tetrazaindene, 3.0 g. | 85 | 1.15 | .09 | 105 | 0.98 | .12 |
| (e) | 5-ethoxycarbonyl-4-methyl-6-oxo-1,3,3a,7-tetrazaindene, 3.0 g. | 85 | 1.12 | .09 | 100 | 1.00 | .11 |

| | | | | | 1 Week Inc., 120° F. | | |
|---|---|---|---|---|---|---|---|
| (f) | Control | 100 | 1.17 | .15 | 82 | 1.00 | .33 |
| (g) | 5-ethoxycarbonyl-4-methyl-2-methylthio-6-oxo-1,3,3a,7-tetrazaindene, .15 g. | 102 | 1.27 | .12 | 100 | 1.15 | .14 |
| (h) | 5-carboxy-4-methyl-2-methylthio-6-oxo-1,3,3a,7-tetrazaindene, .15 g. | 95 | 1.23 | .12 | 97 | 1.17 | .13 |
| (i) | 2-amino-5-ethoxycarbonyl-4-methyl-6-oxo-1,3,3a,7-tetrazaindene, .75 g. | 105 | 1.18 | .13 | 95 | 1.03 | .25 |
| | 2-amino-5-ethoxycarbonyl-4-methyl-6-oxo-1,3,3a,7-tetrazaindene, 3.0 g. | 82 | 1.17 | .12 | 80 | 1.08 | .11 |
| (j) | 2-amino-5-carboxy-4-methyl-6-oxo-1,3,3a,7-tetrazaindene, .75 g. | 68 | 1.30 | .11 | 74 | 1.17 | .14 |
| (k) | 2-amino-4-methyl-6-oxo-1,3,3a,7-tetrazaindene, 2.25 g. | 89 | 1.17 | .12 | 100 | 1.05 | .13 |

The photographic emulsions used in practicing my invention are of the developing-out type.

The emulsions can be chemically sensitized by any of the accepted procedures. The emulsions can be digested with naturally active gelatin, or sulfur compounds can be added such as those described in Sheppard U.S. Patent 1,574,944, issued March 2, 1926, Sheppard et al. U.S. Patent 1,623,499, issued April 5, 1927, and Sheppard et al. U.S. Patent 2,410,689, issued November 5, 1946.

The emulsions can also be sensitized with salts of the noble metals such as ruthenium, rhodium, palladium, iridium, and platinum. Representative compounds are ammonium chloropalladate, potassium chloroplatinate, and sodium chloropalladite, which are used for sensitizing in amounts below that which produces any substantial fog inhibition, as described in Smith and Trivelli U.S. Patent 2,448,060, issued August 31, 1948.

The emulsions can also be chemically sensitized with gold salts as described in Waller et al. U.S. Patent 2,399,083, issued April 23, 1946, and Damschroder et al. U.S. Patent 2,642,361, issued June 16, 1963. Suitable compounds are potassium chloroaurite, potassium aurithiocyanate, potassium chloroaurate, auric trichloride and 2-aurosulfobenzothiazole methochloride.

The emulsions can also be chemically sensitized with reducing agents such as stannous salts (Carroll U.S. Patent 2,487,850, issued November 15, 1949), polyamines, such as diethylene triamine (Lowe and Jones U.S. Patent 2,518,698, issued August 15, 1950), polyamines, such as spermine (Lowe and Allen U.S. Patent 2,521,925, issued September 12, 1950), or bis(β-aminoethyl)sulfide and its water-soluble salts (Lowe and Jones U.S. Patent 2,521,926, issued September 12, 1950).

The emulsions may also contain speed increasing compounds of the quaternary ammonium type of Carroll U.S. Patent 2,271,623, issued February 3, 1942; Carroll and Allen U.S. Patent 2,288,226, issued June 30, 1942; and Carroll and Spence U.S. Patent 2,334,864, issued November 23, 1943; or the polyethylene glycol type of Carroll and Beach U.S. Patent 2,708,162, issued May 10, 1955; or the quaternary ammonium salts and polyethylene glycols of Piper U.S. Patent 2,886,437, issued May 12, 1959; as well as the thiopolymers of Graham and Sagal U.S. application Serial No. 779,839, filed December 12, 1958, now U.S. Patent No. 3,046,129 and the Dann and Chechak U.S. application serial No. 779,874, filed December 12, 1958, now U.S. Patent No. 3,046,134.

The addenda which I have described may be used in various kinds of photographic emulsions. In addition to being useful in X-ray and other nonoptically sensitized emulsions, they may also be used in orthochromatic, panchromatic, and infra-red sensitive emulsions. They may be added to the emulsion before or after any sensitizing dyes which are used. Various silver salts may be used as the sensitive salt such as silver bromide, silver iodide, silver chloride, or mixed silver halides, such as silver chlorobromide and silver bromoiodide. The agents may be used in emulsions intended for color photography, for example, emulsions containing color-forming couplers or emulsions to be developed by solutions containing couplers or other color-generating materials, emulsions of the mixed-packet type, such as described in Godowsky U.S. Patent 2,698,794, issued January 4, 1955; or emulsions of the mixed-grain type, such as described in Carroll and Hanson U.S. Patent 2,592,243, issued April 8, 1952. These agents can also be used in emulsions which form latent images predominantly on the surface of the silver halide crystal or in emulsions which form latent images predominantly inside the silver halide crystal, such as those described in Davey and Knott U.S. Patent 2,592,250, issued April 8, 1952.

These may also be used in emulsions intended for use in diffusion transfer processes which utilize the undeveloped silver halide in the nonimage areas of the negative to form a positive by dissolving the undeveloped silver halide and precipitating it on a receiving layer in close proximity to the original silver halide emulsion layer. Such processes are described in Rott U.S. Patent 2,352,014, issued June 20, 1944, and Land U.S. Patents 2,584,029, issued January 29, 1952; 2,698,236, issued December 28, 1954, and 2,543,181, issued February 27, 1951; and Yackel et al. U.S. patent application Serial No. 586,705, filed May 23, 1956. They may also be used in color transfer processes which utilize the diffusion transfer of an imagewise distribution of developer, coupler or dye, from a light-sensitive layer to a second layer, while the two layers are in close proximity to one another. Color processes of this type are described in Land U.S. Patents 2,559,643, issued July 10, 1951, and 2,698,798, issued January 4, 1955; Land and Rogers Belgian Patents 554,933 and 554,934, granted August 12, 1957; International Polaroid Belgian Patents 554,212, granted July 16, 1957, and 554,935, granted August 12, 1957; Yutzy U.S. Patent 2,756,142, granted July 24, 1956, and Whitmore and Mader U.S. patent application Serial No. 734,141, filed May 9, 1958. They may also be used in emulsions intended for use in a monobath process such as described in Haist et al. U.S. Patent 2,875,048, issued February 24, 1959, and in web-type processes, such as the one described in Tregillus et al. U.S. patent application Serial No. 835,473, filed August 24, 1959.

In the preparation of the silver halide dispersions employed for preparing silver halide emulsions, there may be employed as the dispersing agent for the silver halide in its preparation, gelatin or some other colloidal material such as colloidal albumin, a cellulose derivative or a synthetic resin, for instance, a polyvinyl compound. Some colloids which may be used are polyvinyl alcohol or a hydrolyzed polyvinyl acetate as described in Lowe U.S. Patent 2,286,215, issued June 16, 1942; a far hydrolyzed cellulose ester such as cellulose acetate hydrolyzed to an acetyl content of 19–26% as described in U.S. Patent 2,327,808 of Lowe and Clark, issued August 24, 1943; a water-soluble ethanolamine cellulose acetate as described in Yutzy U.S. Patent 2,322,085, issued June 15, 1943; a polyacrylamide or an imidized polyacrylamide as described in Lowe, Minsk and Kenyon U.S. Patent 2,541,474, issued February 13, 1951; zein as described in Lowe U.S. Patent 2,563,791, issued August 7, 1951; a vinyl alcohol polymer containing urethane carboxylic acid groups of the type described in Unruh and Smith U.S. Patent 2,768,154, issued October 23, 1956; or containing cyano-acetyl groups such as the vinyl alcohol-vinyl cyanoacetate copolymer as described in Unruh, Smith and Priest U.S. Patent 2,808,331, issued October 1, 1957; or a polymeric material which results from polymerizing a protein or a saturated acylated protein with a monomer having a vinyl group as described in U.S. Patent 2,852,382, of Illingsworth, Dann and Gates, issued September 16, 1958.

As indicated above, the tetrazaindene compounds of my invention are particularly useful in the production of X-ray materials, since they have little or no measurable effect upon the spectral sensitivity of photographic silver halide emulsions. This makes many of these tetrazaindene compounds especially adaptable for X-ray use, where the emulsions are generally double coated, that is, one emulsion being coated on each side of a transparent support. These emulsions are generally not spectrally sensitized.

The invention has been described in detail with particular reference to preferred embodiments thereof, but it will be understood that variations and modifications can be effected within the spirit and scope of the invention as described hereinabove and as defined in the appended claims.

What I claim as my invention and desire seccured by Letters Patent of the United States of America is:

1. A photographic silver halide emulsion containing a stabilizing amount of a compound selected from those represented by the following general formula:

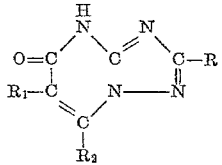

wherein R represents a member selected from the class consisting of amino, methylamino, mercapto, methylmercapto and ethylmercapto, $R_2$ represents a member selected from the class consisting of a hydrogen atom and a lower alkyl group, $R_1$ represents a member selected from the class consisting of a hydrogen atom, a carboxyl radical and a carbalkoxyl radical containing from 2 to 5 carbon atoms.

2. A photographic silver halide emulsion containing a stabilizing amount of the compound represented by the following formula:

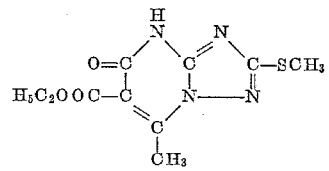

3. A photographic silver halide emulsion containing a stabilizing amount of the compound represented by the following formula:

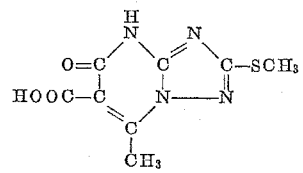

4. A photographic silver halide emulsion containing a stabilizing amount of the compound represented by the following formula:

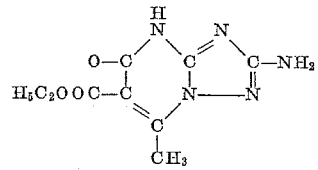

5. A photographic silver halide emulsion containing a stabilizing amount of the compound represented by the following formula:

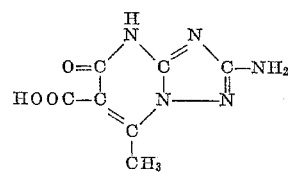

6. A photographic silver halide emulsion containing a stabilizing amount of the compound represented by the following formula:

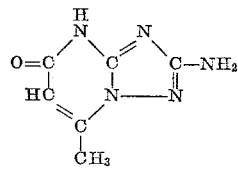

7. A photographic element especially adaptable for use in X-ray photography comprising a transparent support and coated on each side of said transparent support a nonspectrally sensitized photographic silver halide emulsion containing a stabilizing amount of a compound selected from those represented by the following general formula:

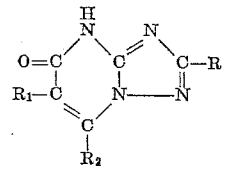

wherein R represents a member selected from the class consisting of amino, methylamino, mercapto, methylmercapto and ethylmercapto, $R_2$ represents a member selected from the class consisting of a hydrogen atom and a lower alkyl group, $R_1$ represents a member selected from the class consisting of a hydrogen atom, a carboxyl radical and a carbalkoxyl radical containing from 2 to 5 carbon atoms.

8. A photographic element especially adaptable for use in X-ray photography comprising a transparent support and coated on each side of said transparent support a nonspectrally sensitized photographic silver halide emulsion containing a stabilizing amount of a compound represented by the following formula:

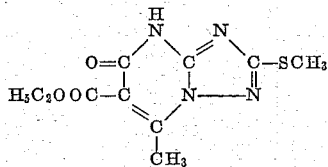

9. A photographic element especially adaptable for use in X-ray photography comprising a transparent support and coated on each side of said transparent support a nonspectrally sensitized photographic silver halide emulsion containing a stabilizing amount of a compound represented by the following formula:

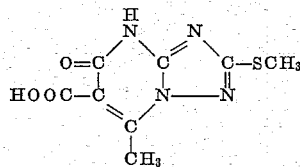

10. A photographic element especially adaptable for use in X-ray photography comprising a transparent support and coated on each side of said transparent support a nonspectrally sensitized photographic silver halide emulsion containing a stabilizing amount of a compound represented by the following formula:

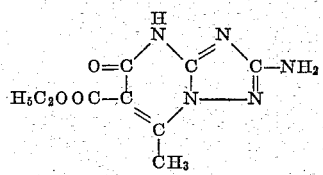

11. A photographic element especially adaptable for use in X-ray photography comprising a transparent support and coated on each side of said transparent support a nonspectrally sensitized photographic silver halide emulsion containing a stabilizing amount of a compound represented by the following formula:

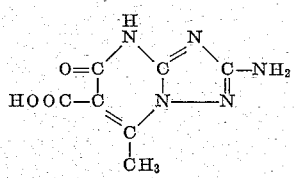

12. A photographic element especially adaptable for use in X-ray photography comprising a transparent support and coated on each side of said transparent support a nonspectrally sensitized photographic silver halide emulsion containing a stabilizing amount of a compound represented by the following formula:

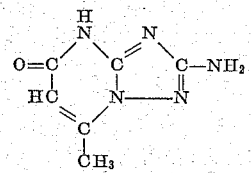

References Cited by the Examiner

UNITED STATES PATENTS

| | | | |
|---|---|---|---|
| 2,526,477 | 10/50 | Heimbach | 96—109 |
| 2,566,658 | 9/51 | Fry | 260—256.4 |
| 2,735,769 | 2/56 | Allen et al. | 96—109 |
| 2,956,876 | 10/60 | Spath | 96—109 |

OTHER REFERENCES

Elderfield: "Heteroyclic Compounds," vol. 6, pages 243–8, 255–6 and 286, John Wiley and Sons, New York (1957).

NORMAN G. TORCHIN, *Primary Examiner.*

LOUISE P. QUAST, *Examiner.*

UNITED STATES PATENT OFFICE
CERTIFICATE OF CORRECTION

Patent No. 3,202,512 August 24, 1965

Leslie Alfred Williams

It is hereby certified that error appears in the above numbered patent requiring correction and that the said Letters Patent should read as corrected below.

In the heading to the printed specification, between lines 8 and 9, insert the following:

Claims priority, application Great Britain Nov. 11, 1960, 38,919/60.

column 10, lines 33 to 39, the formula should appear as shown below instead of as in the patent:

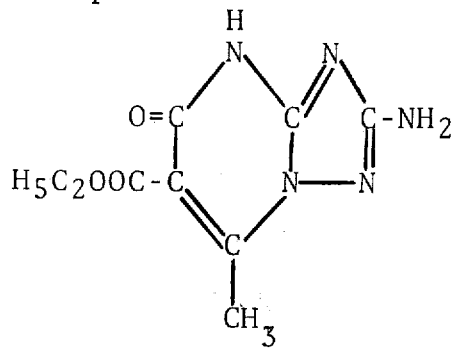

Signed and sealed this 29th day of March 1966.

(SEAL)
Attest:

ERNEST W. SWIDER
Attesting Officer

EDWARD J. BRENNER
Commissioner of Patents